United States Patent [19]

Taniguchi et al.

[11] Patent Number: 4,626,651
[45] Date of Patent: * Dec. 2, 1986

[54] APPARATUS FOR BUTT WELDING STEEL STRIPS BY USING A LASER BEAM IN A STEEL STRIP-PROCESSING LINE

[75] Inventors: Shigeki Taniguchi, Chiba; Kusuo Furukawa, Tokyo; Fumiya Yanagishima; Hiroaki Sasaki, both of Chiba, all of Japan

[73] Assignee: Kawasaki Steel Corporation, Kobe, Japan

[*] Notice: The portion of the term of this patent subsequent to Nov. 18, 2003 has been disclaimed.

[21] Appl. No.: 584,086

[22] Filed: Feb. 27, 1984

[51] Int. Cl.⁴ ............................................. B23K 26/00
[52] U.S. Cl. ...................... 219/121 LC; 219/121 LY; 219/121 EC
[58] Field of Search ................. 219/121 LC, 121 LD, 219/121 EC, 121 ED, 121 PJ, 121 PK, 161, 121 LY

[56] References Cited

FOREIGN PATENT DOCUMENTS 0048040 5/1978 Japan .......................... 219/121 LD
0163087 12/1981 Japan .......................... 219/121 LC

*Primary Examiner*—M. H. Paschall
*Attorney, Agent, or Firm*—Balogh, Osann, Kramer, Dvorak, Genova & Traub

[57] ABSTRACT

A laser butt welding apparatus including a pair of clamp elements at least one of which is movable reciprocally along the steel strip-feed line direction and which are adapted to clamp the edge portions of preceding and trailing steel strips, a shear which is advanceable and retractable between the pair of the clamp elements in a perpendicular direction to the line and cuts the edge portions of the preceding and trailing steel strips, structure for butting the cut faces of the preceding and trailing steel strips while being clamped by means of the clamp elements, and a laser torch adapted to condense a laser beam from a laser oscillator on an off-line at a weld zone and movable in a width direction of the steel strips to be welded together.

11 Claims, 38 Drawing Figures

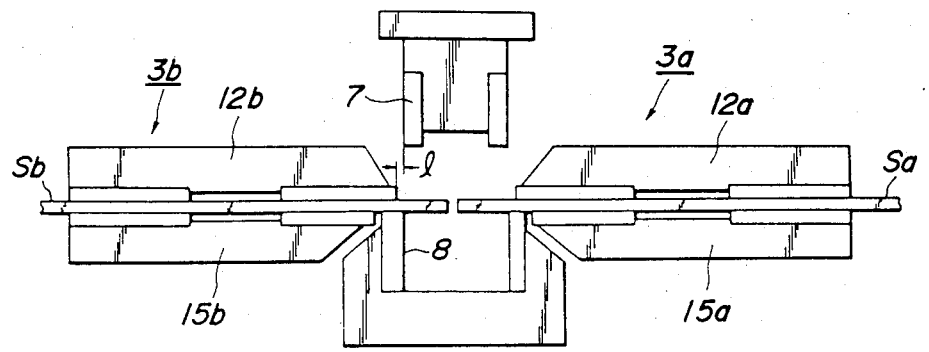
FIG_4
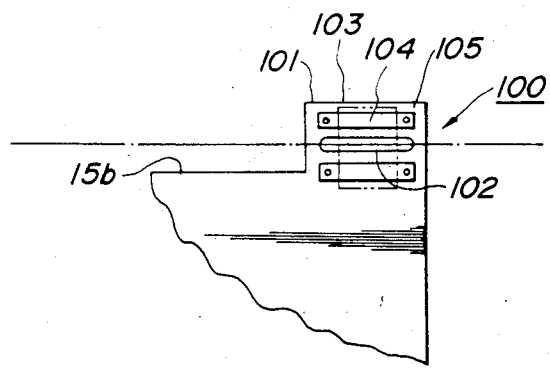
FIG_5

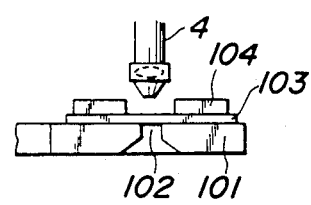
FIG_6a
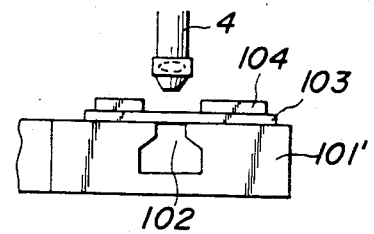
FIG_6b
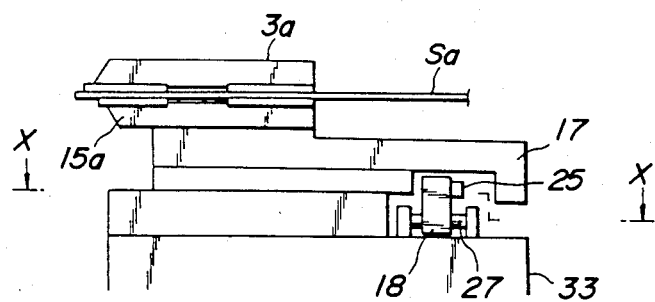
FIG_7
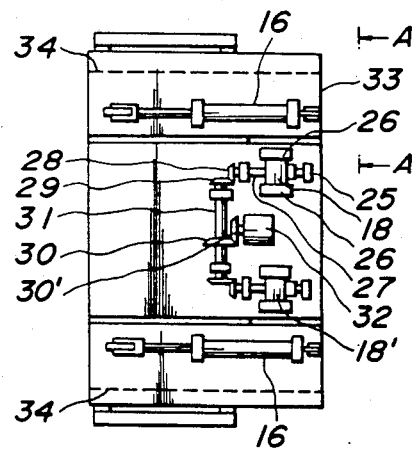
FIG_8

FIG_9
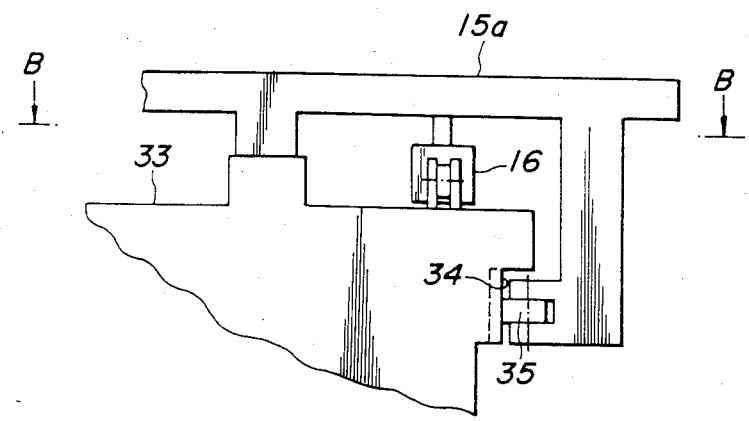
FIG_10
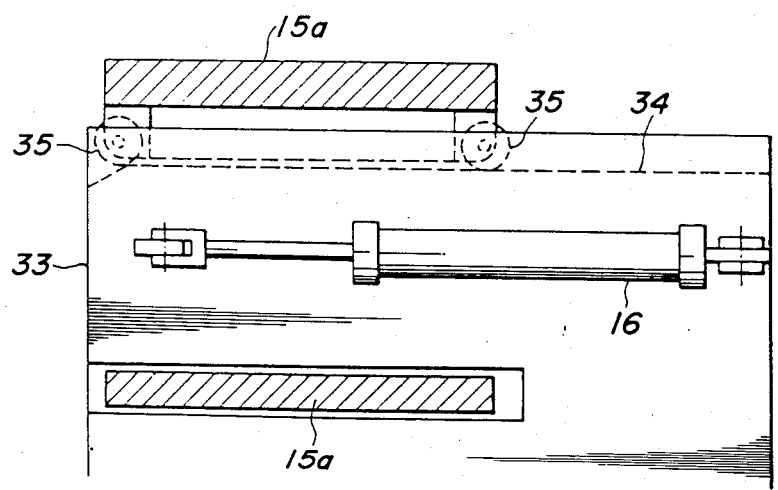

FIG_11a
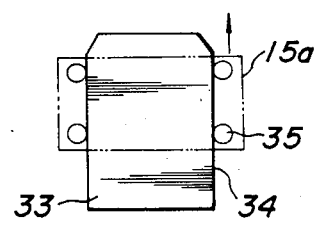
FIG_11b
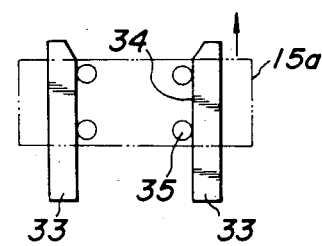
FIG_11c
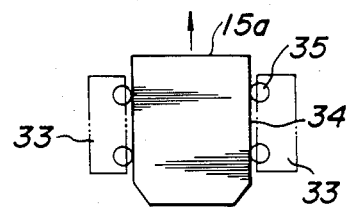
FIG_11d
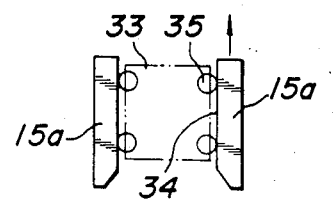

FIG_12
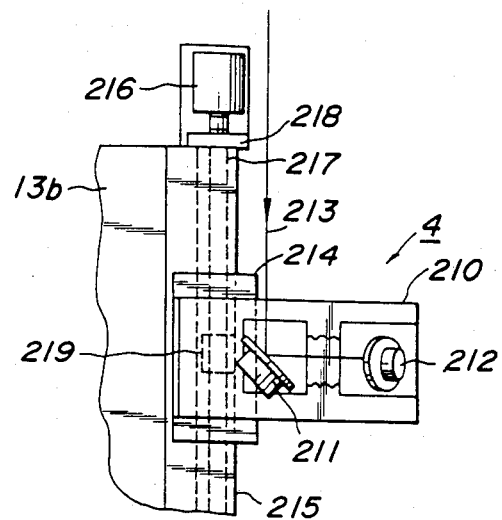
FIG_13
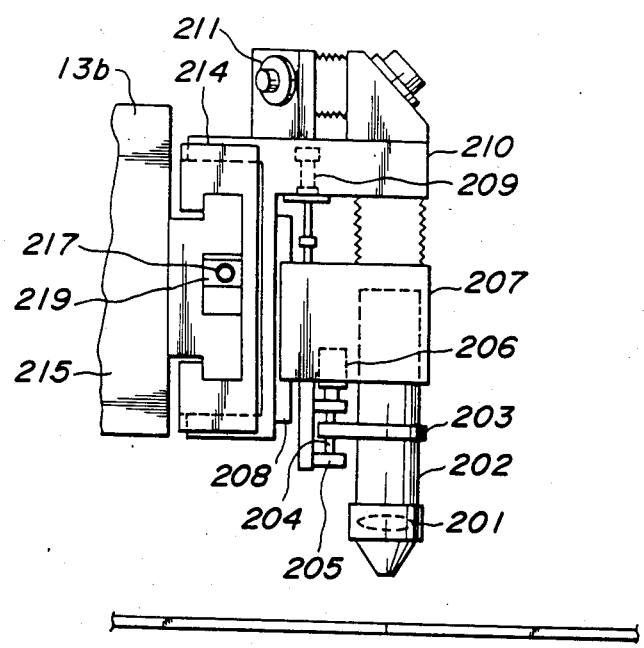

FIG_17a
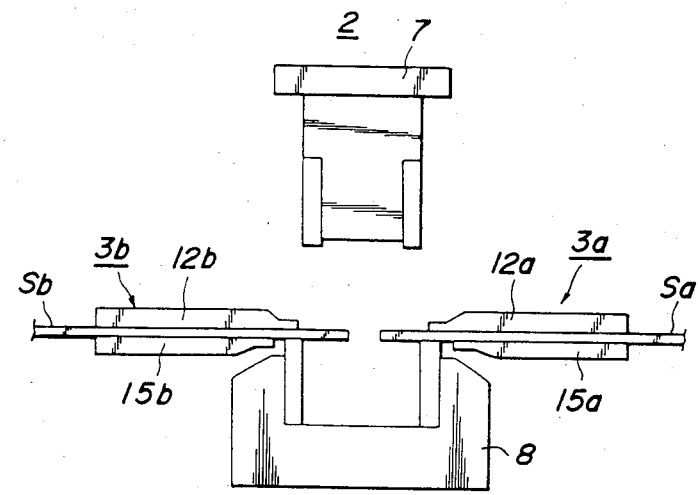
FIG_17b
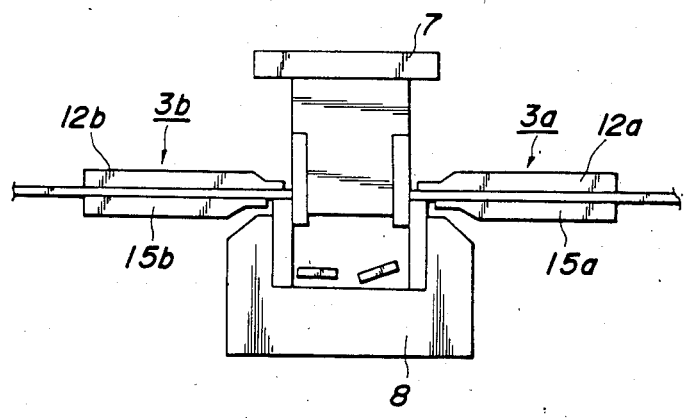

FIG_18
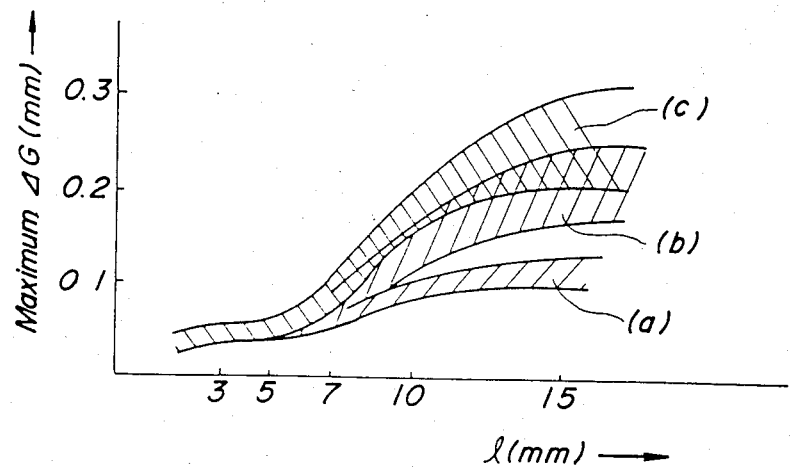
FIG_19
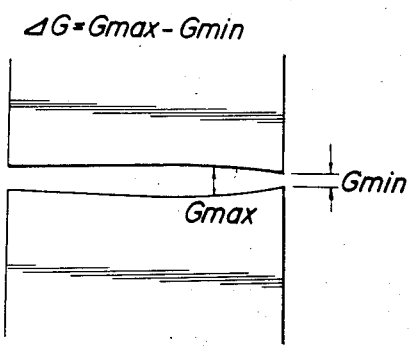

FIG_24a
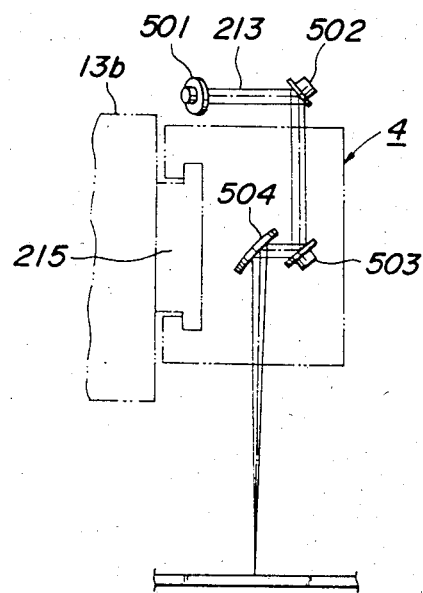
FIG_24b
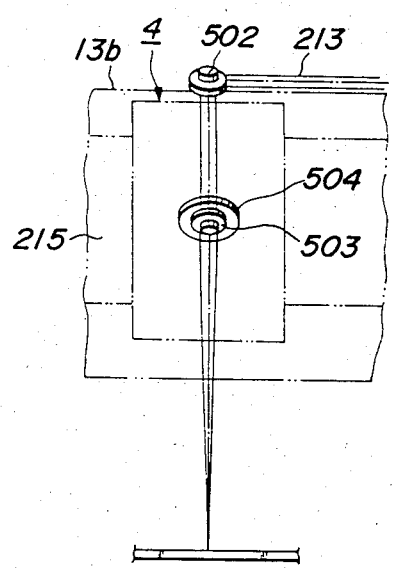

FIG_25a
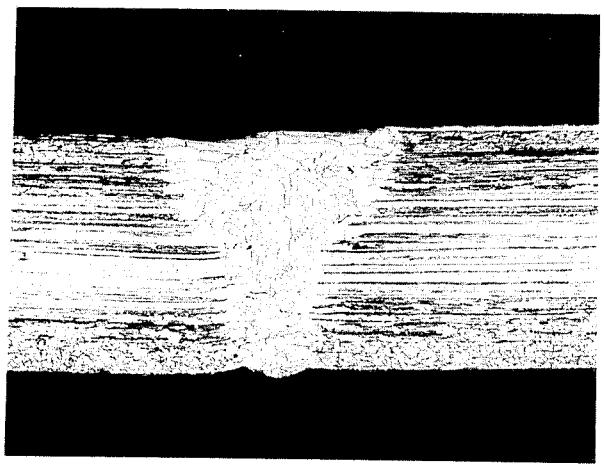
x20
FIG_25b
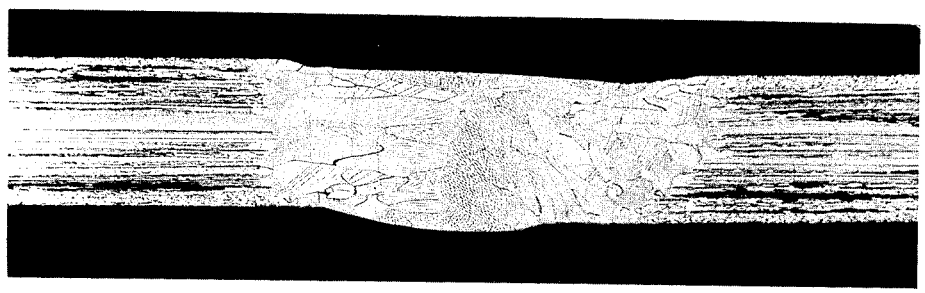
x10

APPARATUS FOR BUTT WELDING STEEL STRIPS BY USING A LASER BEAM IN A STEEL STRIP-PROCESSING LINE

BACKGROUND OF THE INVENTION (1) Field of the Invention

The present invention relates to an apparatus for butt welding steel strips by means of a laser beam (hereinafter referred to as "laser butt welding apparatus") in a steel strip-processing line.

(2) Description of the Prior Art

In a steel strip processing line, steel strips are joined together at an entry section of the line, and fed to a latter stage processing and continuously treated and produced. The steel strips have been conventionally joined by a seam welding machine, a flash butt welding machine, or an arc welding machine such as TIG arc welding machine. These welding methods have their own peculiar characteristics respectively. The seam welding method is characterized in that the welding is possible at a high speed in a short time, but the thickness of the welded portion becomes 180-130% of that of the base metal because the steel strips are welded by piling their edges one upon another. Therefore, the welded portion can not be rolled in a coil by taking the problem such as buckling into account. If a scale is present on the surface of the steel strip as in the case of a hot-rolled steel strip or the like, this method has the defect that the surface must be ground prior to the welding. Further, in the case of the welding of thin steel strips, since the strips are pressed by means of electrode wheels, this method has the drawback that the profile of junction and the vicinity thereof are deteriorated.

The flash butt welding method can make the welding time shorter than the seam welding method because the steel strips are welded at one time over their whole width in the former method, but thin steel strips are likely to be bent due to upsetting step, so that this method has the defect that it is applicable to the relatively thick steel strips of not less than 1.6 mm, but is not applicable to the thin steel strips. It also has the defect that it is inapplicable to special steels such as silicon steel, stainless steel, high carbon steel because of oxidation, a large heat input and the coarse grain growth at the welded portion and heat affected zone when the flashing is effected. As a result, the use of flash butt welding is generally restricted to the welding of the low carbon steel strips of not less than 1.6 mm in thickness.

According to the TIG arc welding method, it is possible to improve the quality of the welded portion through addition of a filler wire or the like, and therefore, this method can be used for stainless steel. However, since the heat input is large, it has the defect that it is inapplicable to the material such as the silicon steel in which the coarse grains are likely to grow. Further, it also has the defects that the welding speed is slow, and the welding time is long.

As mentioned above, although the conventional seam welding, flash butt welding, TIG and arc welding methods and the like have been used by utilizing the respective characteristics, they can not be applied to the silicon steel or the like. Thus, there has been a need or demand for a welding apparatus which can weld the special steels such as silicon steel or the like.

SUMMARY OF THE INVENTION

An object of the present invention is to provide an automatic laser butt welding apparatus for welding steel strips in a steel-processing line by using a laser beam as a heat source.

More specifically, the object of the invention is to provide a laser butt welding apparatus usable for welding almost all kinds of steels, for instance, special steels such as silicon steel, stainless steel or the like, a plated steel such as a galvanized steel or the like, and high tensile strength steels.

It is another object of the invention to provide a laser butt welding apparatus usable for usual steel strips of from small to large thickness by using a laser beam without limiting the thickness as in the case of the flash butt welding.

It is a further object of the invention to provide a laser butt welding apparatus by using a laser beam which enables the far higher speed welding through the TIG arc welding in a high efficiency.

The apparatus according to the invention comprises a pair of clamp means at least one of which is movable forward and rearward along the steel strip-feed line direction and which are adapted to clamp the edge portions of a preceding steel strip and a trailing steel strip, a shear which is advanceable and retractable between the pair of the clamp means in a direction perpendicular to the line and cuts the edge portions of the preceding steel strip and the trailing steel strip, means for butting the cut faces of the preceding steel strip and the trailing steel strip while being clamped by means of the clamp means, and a laser torch mounting a bender reflector adapted to bend a laser beam irradiated from a laser oscillator placed on an off-line and a condenser adapted to condense the laser beam reflected by the bender at a weld zone, which is movable in a transverse direction of the steel strips to be welded together.

These and other objects, features and advantages of the invention will be well appreciated upon reading of the following description of the invention when considered in connection with the accompanying drawings with understanding that some modifications, variations and changes could be easily made by the skilled in the art to which the invention pertains without departing from the spirit of the invention and the scope of the appended claims.

BRIEF DESCRIPTION OF THE ACCOMPANYING DRAWINGS

FIG. 4 is a detailed view illustrating the state in which a preceding steel strip and a trailing steel strip are clamped;

FIG. 5 is a plan view of a station for checking the performances of an optical system for irradiating a laser beam onto a weld zone;

FIG. 6(a) is a side view of the station for checking the performances of the optical system in FIG. 5;

FIG. 6(b) is a side view of another embodiment of the station for checking the performance of the optical system;

FIG. 7 is a side view showing a butting means of an inlet clamp;

FIG. 8 is a plan view of the butting means of the inlet clamp as viewed from the direction of the arrow of X—X in FIG. 7;

FIG. 9 is a sectional view as viewed from the direction of the arrow A—A in FIG. 8;

FIG. 10 is a sectional view as viewed from the direction of the arrow B—B in FIG. 9;

Figure 14:
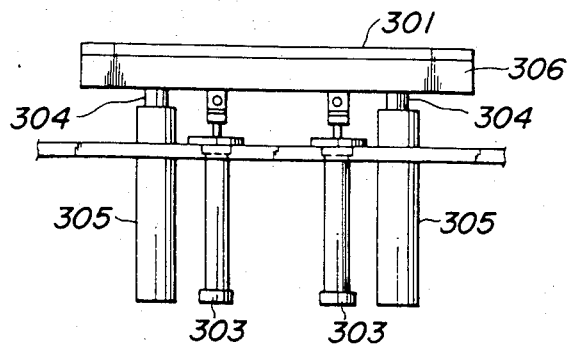
Figure 15:
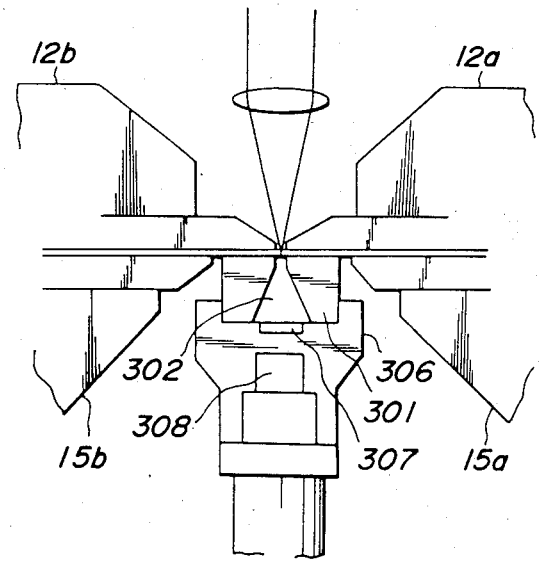
Figure 16:
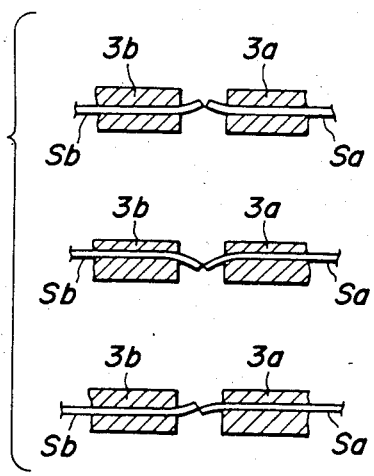
Figure 20:
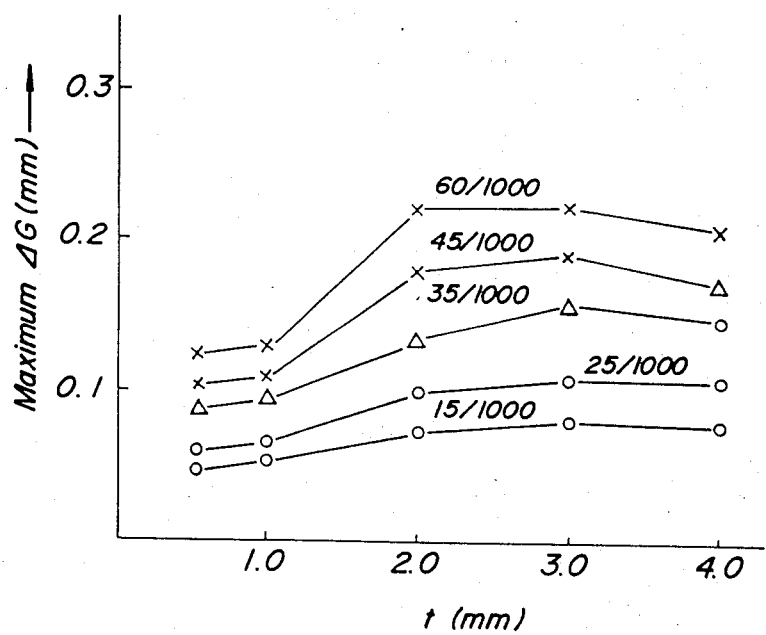
Figure 21:
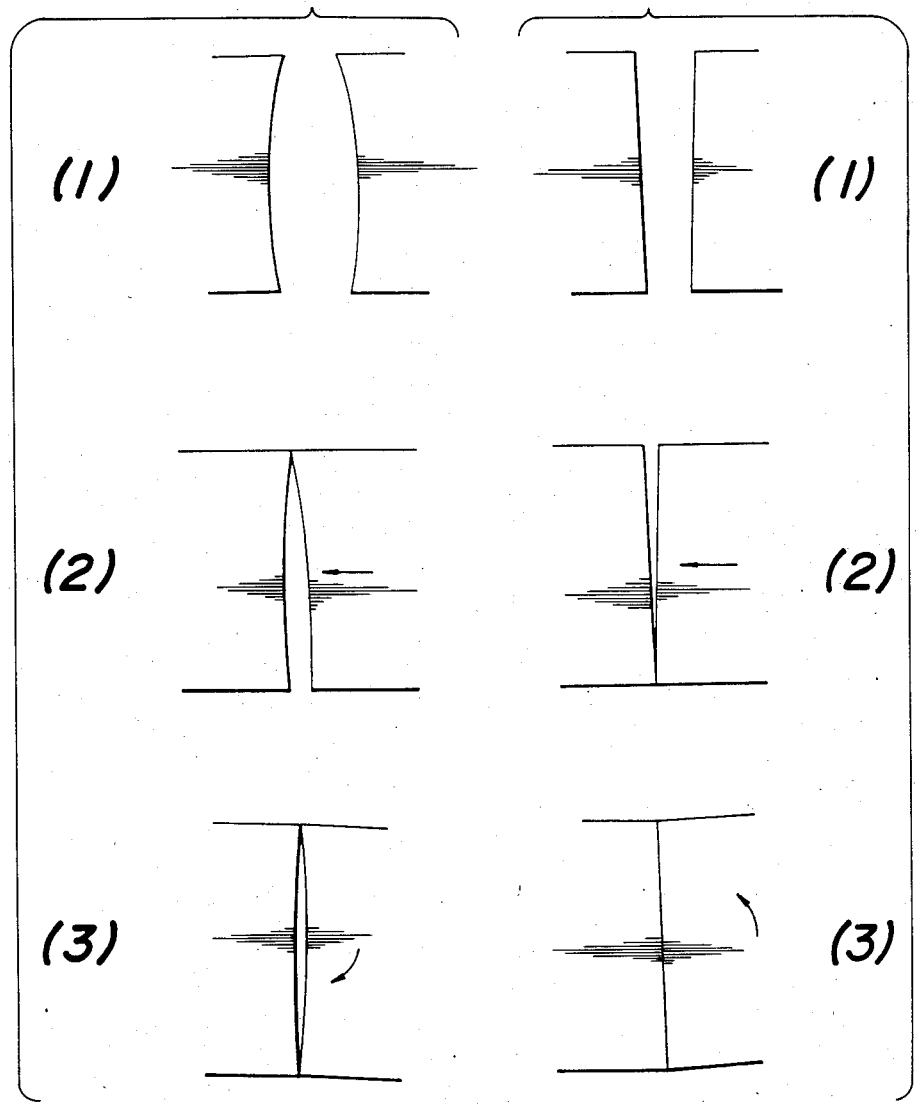
Figure 22:
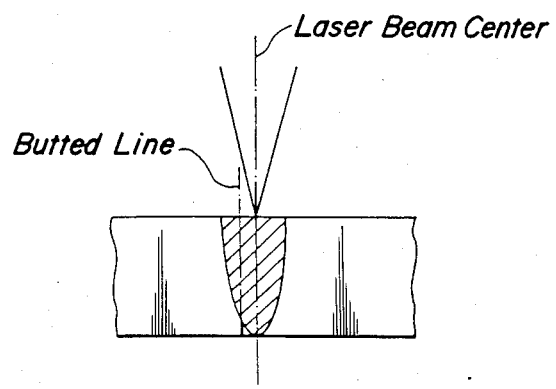
Figure 23A:
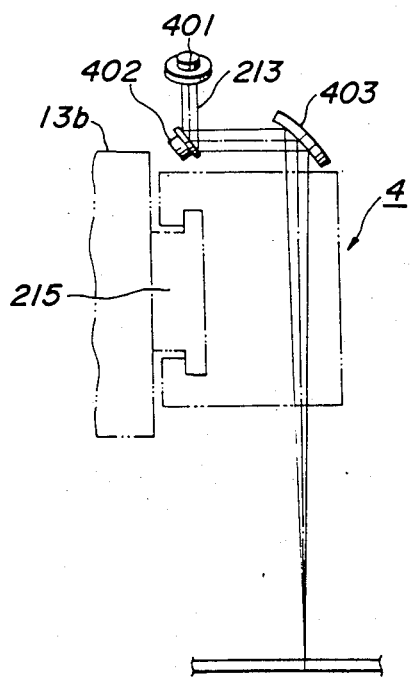
Figure 23B:
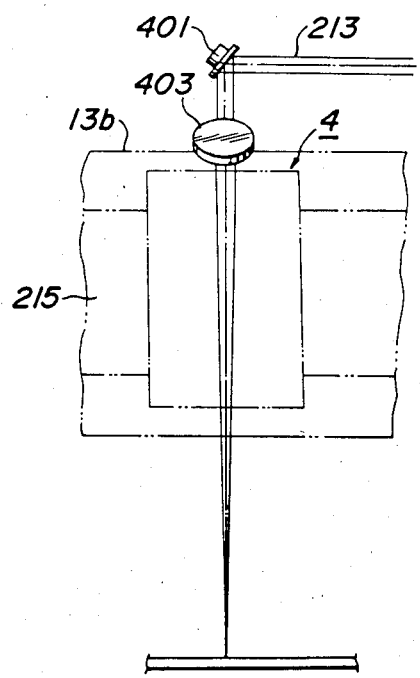

FIGS. 11(a) to 11(d) are other embodiments of the butting means;

FIG. 12 is a plan view of a laser torch;

FIG. 13 is a side view of the laser torch in FIG. 12;

FIG. 14 is a side view of a center clamp;

FIG. 15 is a detailed view of the center clamp in FIG. 14;

FIG. 16 is a sectional view illustrating the state in which the preceding steel strip and the trailing steel strip are improperly butted with each other;

FIGS. 17(a)–17(f) are views schematically illustrating the operation of the laser butt welding apparatus according to the present invention;

FIG. 18 is a graph illustrating the relation between the distance l from a tip of an upper clamp to an edge of an upper blade of the shear and a value ΔG which is obtained by subtracting the minimum value of the distance between the cut preceding steel strip and the cut trailing steel strip in the width direction of said steel strip from the maximum value;

FIG. 19 is a schematic view illustrating the value ΔG in FIG. 18;

FIG. 20 is a graph illustrating the relation between tan α in which α is a blade rake angle of a shear, the value ΔG and the thickness of the steel strip;

FIGS. 21(a) and 21(b) are views illustrating the operation of the butting means of the inlet clamp;

FIG. 22 is a schematic view illustrating a sectional profile of the welded portion formed when the center of the laser beam is deviated from a butt line;

FIGS. 23(a) and 23(b) are side and plan views of another embodiment of the laser beam path construction in the laser torch respectively;

FIGS. 24(a) and 24(b) are side and plan views of still another embodiment of the laser beam path construction of a laser torch; and FIGS. 25(a) and 25(b) are micrographs of the welded joints of silicon steel strips obtained by the laser butt welding of the present invention and TIG arc welding respectively.

DESCRIPTION OF THE PREFERRED EMBODIMENTS

Figure 1:
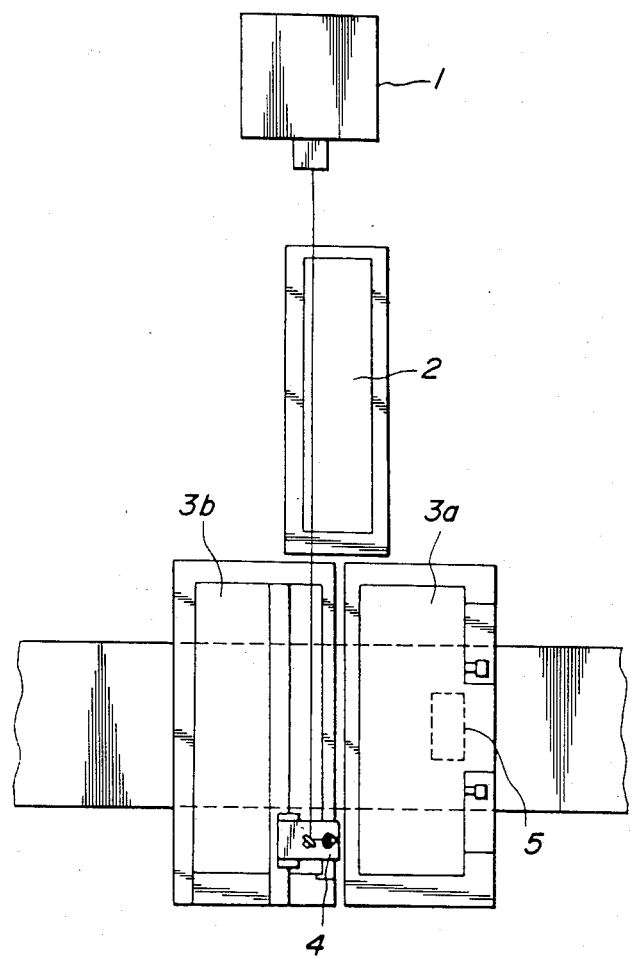
FIG. 1 is a schematic plan view of the whole laser butt welding apparatus according to the present invention.
Figure 2:
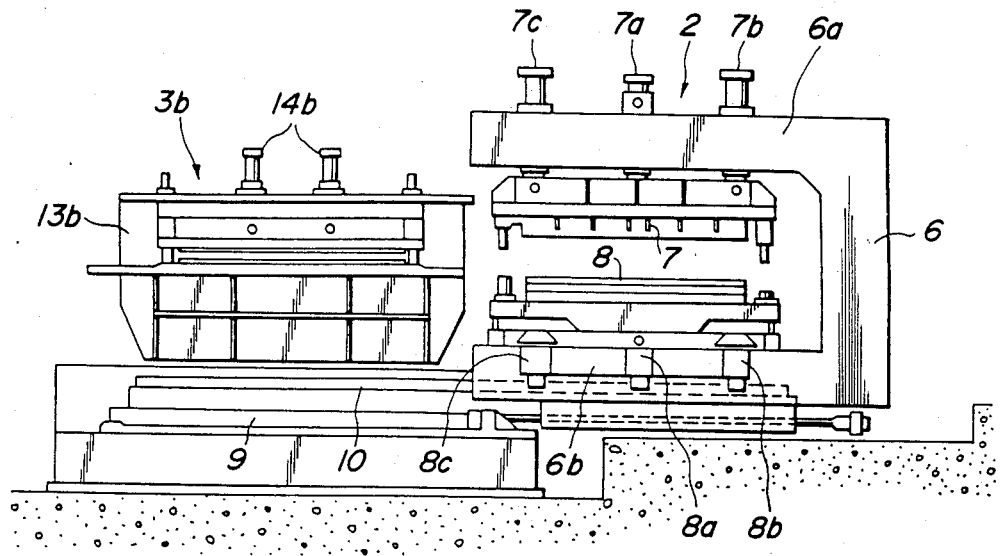
FIG. 2 is a side view of a clamp means and a shear in the laser butt welding apparatus in FIG. 1.
Figure 3:
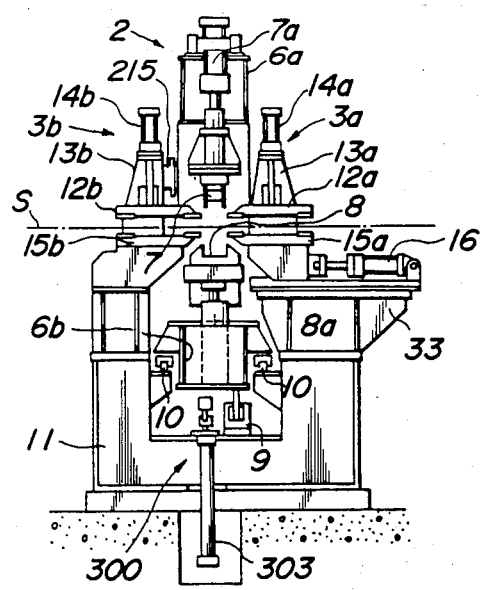
FIG. 3 is a front view of the laser butt welding apparatus in FIG. 1.

The present invention will be explained in more detail with reference to the attached drawings below:

In FIG. 1, reference numerals 1, 2 and 3 are double out shear, a laser oscillator, a double blade shear, and clamp means consisting of an inlet clamp 3a and an outlet clamp 3b respectively. Reference numerals 4 and 5 are a laser torch and a butting means respectively. The double blade shear 2, the clamp means 3 and the butting means 5 will be explained referring to FIGS. 2 and 3. Although the clamp means may be included in the butting means in view of the function but are explained as separate members in the following:

In FIGS. 2 and 3, the double blade shear 2 has upper and lower blades 7 and 8 mounted respectively on the upper and lower arm 6a and 6b of a C-letter shaped frame 6. The blades 7 are vertically movable by means of a cylinder 7a, and guide rods 7b and 7c secured to the upper arm 6a, while the lower blades 8 are vertically movable by means of a cylinder 8a, and guide rods 8b and 8c secured on the lower arm 6b. Each upper blade 7 is provided with a rake angle in a transverse direction of the strip, which is selectively determined in such a range as to improve a shear-cut profile of the strips. The shear 2 is so constituted that the C-letter shaped frame 6 is forwardly and rearwardly movable between the outlet clamp means 3b and the inlet clamp means 3a in a transverse direction of the steel strip while being guided by rails 10, by means of a drive means 9 (for instance, a cylinder). The inlet clamp 3a and the outlet clamp 3b are disposed on a stationary base 11 in opposite relation. The upper clamps or clamp beams 12a and 12b are both vertically movable with respect to the lower clamps 15a and 15b respectively by means of cylinders 14a and 14b secured to the upper frames 13a and 13b, so as to clamp or release the edge portions of steel strips fed on the line. The inlet clamp means 3a moves in the line direction on a lower base 33 of the stationary base 11 by means of a drive means, for instance, a cylinder 16, so that the means moves forwardly or rearwardly with respect to the outlet clamp means 3b. The outlet clamp means 3b is fixed without being displaced in the line direction.

Next, the clamp means is explained in more detail referring to FIG. 4. Top ends of the upper clamps 12a and 12b of the inlet and outlet clamp means 3a and 3b are extended a little longer toward a shear-running line than those of the lower clamps 15a and 15b, so that the steel strips Sa, Sb to be cut are clamped between the tips of the upper clamps 12a, 12b and the lower blades 8.

As shown in FIGS. 5 and 6(a), (b), a station 100 for checking the performances of an optical system for irradiating a laser beam on a weld zone of the steel strips is provided at the lower clamp base 15b on an off-line.

A reference numeral 101 is a table having a slit 102 just under the laser torch 4. Numeral 103 is a sample plate which is secured to the table 101 by means of press plates 104 and bolts 105.

According to this embodiment, the table 101 is joined to the lower clamp base 15b, but it may be supported by a base 33.

Referring next to FIGS. 7–10, the butt means will be explained below.

The trailing steel strip is moved toward the preceding steel strip by actuating the cylinders 16, and is stopped by appropriate means. For instance, the forward movement of the trailing steel strip is stopped upon contacting the shear cut edge of the preceding steel strip. Alternatively, an arm 17 is provided under the inlet clamp means 3a, while a stopper 18 is provided on the base plate 33, so that the trailing steel strip which is moved forwardly is stopped upon contact between the arm 17 and the stopper 18. In such a case, the stopper 18 may be located apart from the lower bent edge side of the arm 17 at the substantially the same distance as that of the gap between the shear cut edge faces of the steel strips, and may be designed in a form of shock absorber.

Further, a pressure detector 25 such as a load cell is provided at a face of the stopper 18 which contacts with the arm 17. The stopper 18 is adapted to be moved while being guided with guide means 26. That is, a screw shaft 27 is screwed to the lower portion of the stopper 18, and the screw shaft is adapted to be rotated for shifting the position of the stopper 18 by actuating the motor 32 via bevel gears 28 and 29, a shaft 31 and bevel gears 30 and 30'. A stopper-positioning system comprising the bevel gears 28, 29, 30 and 30', and the shafts 27 and 31 are arranged onto a lower base 33. With this construction, it may be possible to stop the trailing steel strip slightly spaced from the shear cut edge of the preceding steel strip, and to gently butt the edge faces of the preceding and trailing steel strips by actuating the motor 32 from an output from the stopper or the like. As a matter of course, the motor is stopped by appropriate way after the shear cut edges butt with each other.

In the sliding portion of the inlet lower clamp 15a and the lower base 33, the top portion of a guide member 34 is tapered so that two wheels 35 fitted on the side portion of the inlet clamp means 3a and positioning on the side of the outlet clamp means 3b may be moved in the transverse direction of the steel strip and the steel strip clamped with the inlet clamp means 3a may be slightly pivoted in a horizontal plane, whereby both the cut edge faces of the steel strips to be joined are pivoted so as to come in contact and reduce the gap of the butted portion.

In the above embodiment, two stoppers 18 are driven by means of a single motor 32, but as a matter of course, they may be driven independently by means of two motors.

Some embodiments for attaining the above described mechanism of butting means will be explained with reference to FIGS. 11, a, b, c and d hereinafter.

In FIG. 11a, a reference numeral 33 shows a fixed guide member provided on the base wherein the top portions of both sides of the member have cut portions as shown in FIG. 11, a and two pairs of wheels 35 are provided on the side portions of the inlet lower clamp 15a, so that the wheels slide on guide portions 34 of the guide member 33. When a pair forward wheels 35 slide and advance to the cut portions in this guide member, the inlet lower clamp 15a may be slightly pivoted in the horizontal direction.

In FIG. 11b, a reference numeral 33 shows two fixed guide members provided on the base, wherein each top portion of the members has the cut portion as shown in this figure and the wheels 35 are provided on the side portions of the inlet movable lower clamps and when a pair of forward wheels 35 slide and advance to the cut portions, the inlet lower clamp 15a may be slightly pivoted in the horizontal direction as in the case of FIG. 11a.

In FIG. 11c, a reference numeral 33 shows two fixed guide members provided on the base and a reference numeral 15a shows the supporting member of the movable inlet lower clamp, wherein the rearward end portions have the cut portions as shown in this figure. Two pair of wheels 35 are provided on the fixed guide member 33. When the supporting member or lower clamp beam 15a of the movable inlet clamp means 3a is forwardly moved and the cut portions thereof come to the rearward wheels 35, the inlet lower clamp 15a may be slightly pivoted in the horizontal direction as in the case of FIG. 11, a.

In FIG. 11d, a reference numeral 33 shows a fixed guide member provided on the base 33 which is provided with two pair of wheels 35 and a reference numeral 15a shows movable supporting members 15a or lower clamp beams of the inlet clamp means 3a, which have the cut portions at the rearward end portions as shown in this figure. When the movable supporting members are forwardly moved and the cut portions of the supporting members come to the rearward wheels 35, the inlet lower clamp 15a may be slightly pivoted in the horizontal direction as in the above described former cases.

With reference to FIGS. 12 and 13, the laser torch 4 will be explained below.

A reference numeral 201 is a condenser which is attached to a torch 202. A reference numeral 203 is a bracket attached to the torch 202 and engaged with the screw axis or shaft 204 at its other end. The screw shaft 204 is supported by the bearing 205 at both ends thereof and connected to a motor 206. A reference numeral 207 is a torch holder which is adapted to ascend and descend while being guided by a guide means 208. This torch holder 207 also serves to guide the ascending and descending of the torch 202. A cylinder 209 is attached to a reflector base 210 and adapted to ascend and descend the torch holder 207. Reference numerals 211 and 212 are bender mirrors attached to the reflector base 210, and adapted to bend the laser beam to a desired direction. The reflector base 210 is guided by a carriage 214 and can be moved in a direction perpendicular to the torch running direction by a motor (not shown).

The carriage 214 is adapted to be moved in a direction perpendicular to the processing line by means of a guide means 215, a motor 216, a screw shaft 217 connected to the motor 216, bearings 218 of the screw shaft 217, and a nut 219 screwed to the screw shaft 217.

A center clamp 300 will be explained with reference to FIGS. 3, 14 and 15.

The center clamp 300 is arranged at a side opposite to the laser torch at the butting portion of the preceding and trailing steel strip edge portions, and includes a backing bar 301 provided with a bag-like groove 302. The center clamp further comprises cylinders 303, guide rods 304 and guides 305, and is adapted to be contacted with or separated from the back face of the strips to be joined. Reference numerals 306, 307 and 308 are a backing bar supporting base, a light absorbing member, and a coolant passage respectively. The backing bar 301 is designed to have such a size that the preceding steel strip and the trailing steel strip are fully sandwiched between it and the upper clamps 12a and 12b when elevated.

This bag-like groove 302 prevents the laser beam passed through the weld zone from reflecting and dispersing to the outside and further the safety is assured by preventing the laser beam from leaking to the outside by the provision of a light absorbing member 307 onto the face of a supporting base 306 onto which the laser beam is irradiated.

Further, since the edge portions of the preceding and trailing steel strips are clamped between the upper clamps 12a and 12b and the backing bar 301 during the butting, the deformation of the strip tip portions as shown in FIG. 16 can be avoided.

The operation of the apparatus according to the present invention will be explained with reference to FIGS. 17(a)–17(f) below:

(1) When the edge portions of the preceding steel strip and the trailing steel strip are fed and stopped at predetermined locations, the cylinders 14a and 14b of the inlet and outlet clamp means 3a and 3b are actuated to clamp the preceding steel strip and the trailing steel strip between the clamping means. Next, the cylinder 8a is actuated to lift the lower blade 8 [FIG. 17(a)].

(2) The cylinder 7a is actuated to descend the upper blade 7 to cut the edge portions of the preceding steel strip and the trailing steel strip [FIG. 17(b)].

(3) The cylinder 7a is reversely actuated to lift and retract the upper blade 7 and the cylinder 8a is actuated to descend the lower blade 8. Then, the cylinder 9 is actuated to move the shear 2 to a retracted position on the nonoperation side [FIG. 17(c)].

Figure 17C:
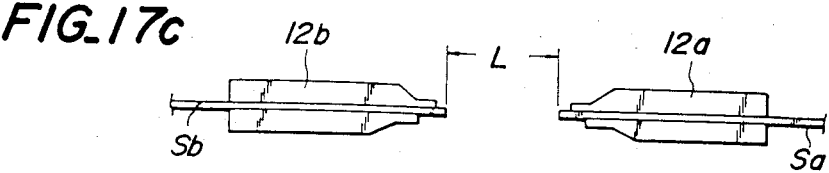
Figure 17D:
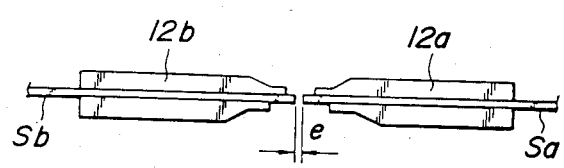
Figure 17E:
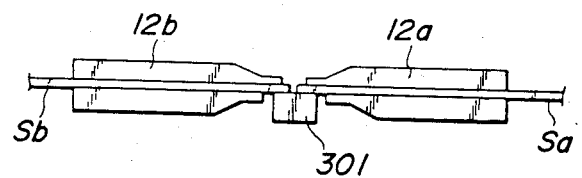
Figure 17F:
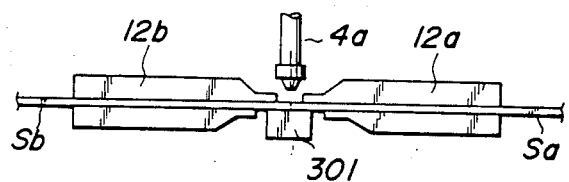

(4) The cylinder 16 is actuated to advance the inlet clamp means 3a, and when the top of the trailing steel strip approaches the tail edge portion of the preceding steel strip [FIG. 17(d)], a cylinder 303 of a center clamp 300 is actuated to clamp the steel strips between the upper clamps 12a and 12b and the center clamp 300 [FIG. 17(e)]. Next, the inlet clamp means 3a is further advanced to complete the butting of the steel strips [FIG. 17(f)].

The edge portions of the steel strips are prevented from being deformed as shown in FIG. 16 by clamping the edge portions between the extended tip portions of the upper clamps and the center clamp. Thus, an excellent welded joint is obtained.

When the top portions of the advancing guides of the inlet clamp means are tapered so as to allow the steel strip to be slightly pivoted in a horizontal plane and the position of the stopper which restrains the advance of the trailing steel strip, is set to be slightly larger than the distance between the cut edge faces of the strip, the butting load is applied onto the edge portions of the steel strips and as the result, if the distance of the cut steel strips is different in the transverse direction of the steel strip, the inlet clamp may be pivoted as shown in FIGS. 21(a) and 21(b) and both the edges of the steel strips come in contact with each other so that the gap becomes smaller than the case where the butting is carried out through advancing the cut steel strip by only the predetermined distance.

Consequently, the joints having more stable and higher strength can be obtained.

Even if the distance between the edges of the cut strips varies a little, the steel strips are tightly butted with substantially no gap therebetween by setting the distance between the stopper 18 and the bent portion of the guide 17 slightly wider than the distance between the cut edges of the strips. Further, with respect to the deviation from the straight line of the cut lines, the gap can be made smaller by rotating the inlet clamp. Although the trailing steel strip is slightly inclined to the line owing to the pivotal movement of the inlet clamp, this is around 0.1 mm/1,000 mm, and no problem is caused.

It is important to approach the gap value as near to zero as possible in the case of the laser butt welding.

(5) The motor 216 is actuated to drive the laser torch in the transverse direction of the steel strip. In the way, when a detector not shown detects the side end of the strip, a shutter housed in the laser oscillator 1 is opened to irradiate the laser beam onto the side of the laser torch 4. The laser beam is bent in a direction parallel to the line by means of a reflector 211, and is next bent in a direction vertical to the line by means of a reflector 212 and then passed through the condenser 201 to be focused onto a weld zone and to commerse the welding. The laser torch is run in the transverse direction of the strip, and the shutter is closed when the other strip side end is sensed by means of the side end detector to stop the irradiation of the laser beam. Then, the torch is carried to the retracted position and stopped.

By once changing the laser beam path in parallel to the line in the laser torch 4, the focused position in the line direction of the laser beam path posterior to the reflector 212 can be varied merely by horizontally shifting the laser torch 4 in the line direction.

Particularly, when the laser beam or the like is used, the beam path may be slightly varied depending upon the circumferential temperature, a leading period of time of the oscillator, a temperature of the reflector, and the like, and consequently there is the possibility that the beam point focused by the condenser is shifted slightly. Since the shift component of the focus in the direction perpendicular to the processing line is no problem because it is in a weld line, while if the focus is shifted in the direction parallel to the line, it is deviated from the butting line to form weld a profile as shown in FIG. 22. Since this form of the joint has a notch in the lower side, it is weak in bending and unacceptable. For this reason, it is extremely important to control the focus location in the direction parallel to the line in using the laser butt welding apparatus. According to the laser butt welding apparatus of the invention, in order to facilitate the positioning of the focus in the line direction, the laser beam path is bent in parallel to the line at least one time and then the optical system after such a bending step is moved to a horizontal direction, whereby the focus can be moved in a direction parallel to the line by the same distance as the moved amount of the optical system without moving the focus to the vertical direction and the direction perpendicular to the line and the operation for positioning the focus can be very easily effected.

In the following, other embodiments of optical system adapted to bend the laser beam path to the direction parallel to the line at least one time will be explained hereinafter.

In FIG. 23, a reference numeral 401 is a first reflector adapted to bend the laser beam 213 incident thereupon in a direction perpendicular to the line, in the vertical direction to the line, a reference numeral 402 is a second reflector adapted to bend the laser beam thus vertically bent in the direction parallel to the line, and a reference numeral 403 is a condensing reflector adapted to focus the laser beam in parallel to the line thus bent, at a weld zone.

Merely by horizontally displacing the laser torch 202 in the line direction, the focus is shifted by the same distance as this displacement only in the direction parallel to the line without being shifted in the vertical direction or perpendicular direction to the line.

The focusing is carried out by moving the reflector 402 and the condensing reflector 403 as one set in a vertical direction.

FIG. 24 shows another embodiment using a condensing reflector.

A reference numeral 501 is a first reflector adapted to bend the laser beam 213 incident thereupon in the direction perpendicular to the line, in the direction parallel to the line, a reference numeral 502 is a second reflector adapted to vertically bend the laser beam thus bent, in the direction parallel to the line, a reference numeral 503 is a third reflector adapted to bend the thus vertically bent laser beam in the direction parallel to the line, and a reference numeral 504 is a condensing reflector adapted to focus the laser beam at the weld zone.

According to this embodiment, by displacing the condensing reflector 504 in the direction parallel to the line, the focus point is horizontally shifted by the same distance as displacement of the condenser reflector in the parallel direction to the line without being displaced vertically or in the direction perpendicular to the line.

The focusing is carried out by vertically shifting the reflector 503 and the condensing mirror as one set.

(6) When the welding is completed, the upper clamps of the inlet and outlet clamp means 3a and 3b are lifted to release the edge portions of the preceding and trailing steel strips, and the passing of the steel strip starts.

Subsequently, the cylinder 209 is actuated to lift and return the laser torch to the original position, and the other means are returned to their original locations. Thereby, one weld process is completed.

In the above described step (3) for cutting the steel strips, it is particularly important that the cut lines formed through the above cutting operation are in parallel to each other and straight in the case of the laser butt welding. That is, when the laser beam is condensed by the condenser, the diameter of the laser beam at the focus is varied according to the focal length of the condenser, for instance, when a condenser having a focal length of 5 inches is used, the diameter is as extremely small as 0.15 mm. Therefore, according to the laser butt welding, it is possible to increase the energy density and to effect a high speed welding, but an extremely high precision is required in butting of the materials to be welded. If the cut lines of the materials to be welded are curved, a clearance remains even if the butting is effected at a very high precision. In general, when the steel plate is cut by means of a raked shear (guillotine shear, rotary shear or the like), the cut line is more or less curved as shown in FIG. 19 in a transverse direction of the plate. The curved degree of the cut line depends upon the material, clamping way, shear or the like, but it is observed that the cut line is curved at about 0.1 mm in the case of a steel plate having a thickness of 1.0~3.0 mm. Thus, even if such curved-edge steel strips are butt-welded, no welded joints having satisfactory strength can be obtained.

According to the present invention, it is possible to obtain a set of steel strips having parallel and nearly straight cut lines by clamping the edge portions of the steel strips between the upper clamps 12a and 12b which are more extended toward the shear than the lower clamps 15a and 15b and the upper end portion of the lower blade 8. FIG. 18 shows the relation of the distance l from the edge of the upper clamp to the tip face of the upper blade to a value ΔG obtained by subtracting the minimum cut gap (Gmin) from the maximum cut gap (Gmax) among the cut gaps measured in the transverse direction of the strip (see FIG. 19). Table 1 shows the results obtained when the above described cut edge portions are butted and the butted portion is subjected to the laser butt welding.

TABLE 1

| Distance | (Tensile test) Plate thickness (mm) | | | |
|---|---|---|---|---|
| l (mm) | 1.0 | 1.6 | 2.2 | 3.0 |
| 15 | Δ | x | x | x |
| 10 | Δ | Δ | Δ | x |
| 7 | o | o | o | o |
| 5 | o | o | o | o |
| 3 | o | o | o | o |

Note:
o Rupture of base metal
Δ Rupture of base metal or welded joint
x Rupture of welded joint From the above data, it can be seen that the excellent welding is possible in a range of l being not more than 7 mm. In a range of 7<l≦15, the rupture at the welded portion is likely to be caused and there is problem in plate-passing, rolling or other processing steps of the strip. In FIG. 18, the zones (a), (b) and (c) correspond to the steel strips having thickness (t) of 1.0 mm, 1.6 mm and 3.0 mm respectively. The welding conditions in the test of Table 1 are as follows, that is a laser power is 1 kw, the materials are cold-rolled steel strip and hot-rolled steel strip (low carbon steel) and the welding speed is 1.0–3.0 m/min.

In the Table 1, the marks (Δ) means that the tensile strength when the welded joint portion is ruptured, is about 80–100% of that of the base metal and the mark (x) means about 40–80% thereof.

Thus, the steel strips of the mark (Δ) satisfactorily endure the plate-passing in the processing line, while a part of the steel strips of the mark (x) (l=10, t=3.0 mm) has the tensile strength near 80% of that of the base metal and therefore, they also satisfactorily endure the plate-passing in the processing line.

When the l can not be set to be not more than 10 mm for the reason that the extended portion of the upper clamp interferes with a nozzle portion of the laser torch, the following system is proposed. FIG. 20 shows a relation between the tan α in which α is the rake angle of the share upper blades and the above described value ΔG.

From these results, it is understood that the smaller tan α (α: a rake angle), the smaller is the curve of the cut lines and as the results the welding results are better. According to the test results it has been found that when the range of the tan α (α: rake angle) is (35+2.5t)/1,000, in which t denotes the thickness of the steel strip, the strength of the joints is high. FIG. 20 is an example when l is 15 mm. In the case of l=12 mm or 20 mm, similar results were obtained.

Even when l is not more than 10 mm, the curve of the cut line may be more reduced by making the rake angle tan α smaller and the good welded joint can be stably obtained.

The smaller the rake angle tan α, the smaller the curve of the cut line is, but the shearing-cut force becomes larger with increase in tan α and the strength of the frame strength is needed and the equipment cost is increased.

Therefore, the lower limit for the practical range of tan α is about 4t/1,000. That is, the lower limit is 2.4/1,000 in the case of 0.6 mm in thickness, 12/1,000 in the case of 3 mm in thickness and 18/1,000 in the case of 4.5 mm in thickness.

Next, the use of the station 100 for checking the performance of the optical system will be explained below:

The condensing performance of the condenser is deteriorated owing to a long period of time of use, or the condenser is broken or damaged due to the spattered metal. Therefore, the condenser should be exchanged at a specific time interval or at an irregular time interval. At such a time, the tip portion of the condenser is removed and a fresh one is attached. In this exchanging operation, the welding apparatus restores the normal state, and becomes applicable in the processing line. Usually, the deterioration period of the condensing performance is not constant, and the usable time period is unclear. Further, there is no way to detect the deterioration degree of the condenser other than the difference between the laser power of the laser beam prior to and after passing through the condenser or the variation of the depth of the laser beam penetrated. In addition, it is also necessary to check whether the fresh one which is exchanged exhibits a predetermined performance or not. If such checking operations are carried out on the line, the line operation must be stopped during such checking.

For solving the above drawbacks, according to the invention, the station 100 for checking the performances of the optical system is provided at a position on the line extended from the laser torch running line, where the passing of the steel strip is not interrupted, so that the above described working for the condenser can be carried out during the time when the steel strips are passed on the line, whereby the productivity is increased.

The station for checking the performances of the optical system is used as follows:

First, the laser torch 4 stopped at a predetermined retracted position on the operational side is carried to the station for checking the performances of the optical system by actuating a motor 216. Next, a sample plate 103 is placed on a table 101, and secured onto the table by means of press plates 104 and bolts 105. Then, the laser torch is run over the sample plate to irradiate the plate with the laser beam and then the color of the reflected beam and the depth of the weld penetration are checked and it is checked whether the focus of the condenser is proper or not or whether the condensing performance has been deteriorated or not. This station can be utilized to check as to whether the distribution of the laser beam energy intensity is proper or not, and the deviation of the laser beam axis from the butted line.

FIG. 6(b) is another embodiment of the station for checking the performances of the optical system in which the lower portion of the slit is closed for preventing the penetration or scattering of the laser beam.

The following Table 2 shows the comparison of the welding time of the laser butt welding according to the invention with the TIG arc welding. The comparison was made with respect to two kinds of steel strips having a thickness of 1.0 mm and 2.3 mm. The laser power is 1.3 kw and torch-running distance in the laser butt welding and TIG arc welding is 1.5 m. It is understood from this table that with respect to the same thickness of the steel strips, the welding time in the laser butt welding is less than 0.5 time as short as that of the TIG arc welding.

TABLE 2

| Welding method | Plate thickness (mm) | Laser power (kw) | Welding speed (cm/min) | (1) Welding time (sec) | (2) Operating time before and after the welding (sec) | (1) + (2) Total time (sec) |
| --- | --- | --- | --- | --- | --- | --- |
| TIG | 2.3 | 4 | 30 | 130 | 30 | 210 |
| TIG | 1.0 | 2 | 60 | 90 | 30 | 120 |
| Laser butt (Invention) | 2.3 | 1 | 150 | 60 | 30 | 90 |
| Laser butt (Invention) | 1.0 | 1 | 500 | 20 | 30 | 50 |
| Laser butt (Invention) | 2.3 | 3 | 400 | 25 | 30 | 55 |

The following Table 3 shows the test results obtained in the tensile tests with respect to the welded portions of various steel strips by using the laser butt welding apparatus according to the present invention. The width of the test steel strip is 914–1,067 mm, and five test pieces are cut off in the width direction and the test is made with respect to these test pieces. In all the test pieces, the rupture occurs at the base metal and the welding strength is excellent.

TABLE 3

Mechanical property of laser welded joints (Laser power 1 kw) Tensile strength

| Steel | | Thickness (mm) | Welding speed (m/min) | Tensile strength (kg/mm$^2$) | Location of rupture |
| --- | --- | --- | --- | --- | --- |
| Mild | | 1.0 | 4.0 | 31 | Base metal |
| High-tensile | | 1.0 | 4.0 | 40 | " |
| Galvanized | | 0.9 | 3.5 | 31 | " |
| Silicon | | 2.0 | 1.25 | 60 | " |
| Stainless | SUS304 | 2.0 | 1.25 | 62 | " |
| | SUS430 | 1.0 | 4.0 | 49 | " |

FIGS. 25(a) and 25(b) are photographs showing micro-structure of the sections of the welded portions in the cases of the laser butt welding and the TIG arc welding respectively. In FIG. 25(a), the thickness of the steel strip is 2.0 mm, the laser power is 1 kw and the welding speed is 1.25 m/min. In FIG. 25(b), the thickness of the steel strip is 2.0 mm, the electric power is 3.8 kw and the welding speed is 0.5 m/min. From the comparison it can be seen that the structure in the case of the laser butt welding is more fine than that of the TIG arc welding and therefore the welding strength is higher in the case of the laser butt welding according to the invention. Further, it can be seen that the profile of the weld portion is small in unevenness in the laser butt welding than in the TIG arc welding.

The invention can exhibit the following merits:

(1) The welding time can be reduced.

(2) The productivity is higher.

(3) It is possible to weld almost all kinds of the steels, for instance, special steels such as silicon steel, stainless steel or the like, a plated steel such as a galvanized steel sheet or the like, and high tensile strength steels by using the laser butt welding apparatus according to the invention.

(4) Since no bead at the weld portion is formed, the formation of faults caused in coiling can be reduced.

(5) The strength at the welded portions is improved, so that no rupture of the welded portion occurs in the line.

What is claimed is:

1. A laser butt welding apparatus comprising a pair of clamp means of an inlet clamp means and an outlet clamp means, at least one of which is movable forward and rearward along the steel strip-feed line direction and which are adapted to clamp the edge portions of a preceding steel strip and a trailing steel strip, each of said inlet and outlet clamp means having an upper clamp beam and a lower clamp beam, the upper clamp beams of the inlet and outlet clamp means extending nearer to each other than the lower clamp beams of the inlet and outlet clamp means, a shearing means consisting of a preceding steel strip shear, and a trailing steel strip shear each having a lower shearing blade and an upper shearing blade which are independently movable up or down, said shearing means being adapted to be advanceable and retractable between the pair of the clamp means in a perpendicular direction to the line, and adapted to cut the edge portions of the preceding and trailing steel strips by lowering the upper blades while in said shearing, the edge portions of the preceding and trailing steel strips being firmly sandwiched between the lower shearing blades and the upper clamp beams of the preceding steel strip and trailing steel strip sides, means for butting the cut faces of the preceding and trailing steel strips while being clamped by means of the clamp means, said butting means being adapted to advance the preceding and/or the trailing steel strip so as to bring the cut faces of the preceding and trailing steel strips into butting contact with each other and to finely adjust the preceding and trailing steel strips through pivotal movement in a horizontal plane, so that the butting is more closely done to meet with actual sheared shapes of the cut ends of the preceding and trailing steel strips, a center clamp arranged under the butting portion of the preceding and trailing steel strips and is accessible thereto, for cooperation with said butting means, the center clamp comprising a backing bar adapted to be elevated before welding to clamp the butted ends of the preceding and trailing steel strips in cooperation with the upper clamp beams, thereby correcting the butted portion of the preceding and trailing steel strips, and laser torch means for cooperating with said butting means and the center clamp in butt welding a joint of the cut faces of the preceding and trailing steel strips, the laser torch means comprising a laser oscillator for irradiating a laser beam, which oscillator is placed on an off-line, a bender mirror adapted to bend the laser beam irradiated by said oscillator, and a condensor adapted to condense the laser beam reflected by the bender mirror at a weld zone, which is movable in a transverse direction of the steel strips to be joined.

2. The apparatus according to claim 1, wherein the laser torch means comprises an optical system by which the laser beam is straightly run in a direction parallel to the steel strip-feed line at least one time when the laser beam is fed to the weld zone from the laser oscillator.

3. The apparatus according to claim 2, wherein the optical system comprises a reflector adapted to bend the laser beam incident thereupon in the perpendicular direction to the line into a direction parallel to the line, a reflector adapted to vertically bend the laser beam bent in the direction parallel to the line, and a condenser adapted to focalize the thus vertically bent laser beam at the weld zone.

4. The apparatus according to claim 2, wherein the optical system comprises a reflector adapted to vertically bend the laser beam incident thereupon in the perpendicular direction to the line, a reflector adapted to bend the vertically bent laser beam in the direction parallel to the line, and a condensing reflector adapted to focalize the laser beam thus bent in the direction parallel to the line at the weld zone.

5. The apparatus according to claim 2, wherein the optical system comprises a reflector adapted to bend the laser beam incident thereupon in the direction perpendicular to the line into the direction parallel to the line, a reflector adapted to vertically bend the laser beam thus bent in the direction parallel to the line, a reflector adapted to introduce the thus vertically bent laser beam to a condensing reflector, and the condensing reflector focalizes the laser beam to the weld zone.

6. The apparatus according to claim 1, wherein tip portions of the upper clamp beams of the inlet and outlet clamp means are extended over those of the lower clamp beams so that the edge portions of the steel strips are sandwiched between said extended tip portions and the upper edges of the lower shearing blades, and a distance between the edge of each of the extended tip portions and the side edge of a respective upper shearing blade is not more than 10 mm.

7. The apparatus according to claim 1, wherein $\tan \alpha$ of the upper shearing blades of the preceding steel strip and trailing steel strip shears in which $\alpha$ is a rake angle, is not more than $(35+2.5t)/1{,}000$ in which $t$ is a thickness (mm) of the steel strips.

8. The apparatus according to claim 1, wherein the inlet clamp means is movable forward and rearward along the steel strip-feed line direction, and the butting means comprises a fixed guide member adapted to move and guide the movable inlet clamp means in the steel strip-feed line, the lower clamp beam of the movable inlet clamp means forming a supporting member of the movable inlet clamp means which is in a sliding relation to the fixed guide member, a pair of wheels provided at each of a forward position and a rearward position of the supporting member of the movable inlet clamp means or the fixed guide member, by which the fixed guide member and the supporting member are kept in the sliding relation, and a drive means by which the supporting member of the movable inlet clamp means is slided with respect to the fixed guide member, the top end portion of the fixed guide member having cut side portions which form a clearance between the forward pair of wheels and the fixed guide member so that the movable inlet clamp means is slightly pivotable in a horizontal direction for reducing a gap between the butted steel strips when a cut edge face of the steel strip clamped by the movable clamp means contacts with a cut edge face of the other steel strip.

9. The apparatus according to claim 8, wherein the top end portion of the rear end portion of the supporting member is provided with cut side portions which form a clearance between the rearward wheels and the supporting member, so that the movable inlet clamp means is slightly pivotable in a horizontal direction for reducing a gap between the butted steel strips, when a cut edge face of the steel strip clamped by the movable inlet clamp means contacts with a cut edge face of the other steel strip.

10. The apparatus according to claim 1, wherein the laser torch means comprises an optical system for irradiating the laser beam on a weld zone of said joint, and said apparatus comprises a station adapted for checking the performance of the optical system in irradiating the laser beam on the weld zone, said station being arranged on a line extended from the laser torch running path.

11. The apparatus according to claim 1, wherein the upper clamp beams of the inlet and outlet clamp means have extending portions overlapping the lower clamp beams of the inlet and outlet clamp means, and said backing bar adapted to clamp the edge portions of the steel strips between said extending portions and the upper edges thereof.

* * * * *